(12) United States Patent
Durham et al.

(10) Patent No.: US 8,201,773 B1
(45) Date of Patent: Jun. 19, 2012

(54) FLEXIBLE SELF-ERECTING SUBSTRUCTURES FOR SENSOR NETWORKS

(75) Inventors: Jayson T. Durham, Lakeside, CA (US); Joshua Blanchi, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 923 days.

(21) Appl. No.: 12/167,075

(22) Filed: Jul. 2, 2008

(51) Int. Cl.
*B64C 3/56* (2006.01)

(52) U.S. Cl. ............ 244/49; 244/46; 244/218; 244/219; 244/99.8

(58) Field of Classification Search .................. 244/218, 244/219, 99.8, 125.1, 130, 46, 49
See application file for complete search history.

(56) References Cited

U.S. PATENT DOCUMENTS

| | | | |
|---|---|---|---|
| 4,494,121 A * | 1/1985 | Walter et al. ................. | 343/708 |
| 4,768,738 A | 9/1988 | Weinert | |
| 5,352,565 A | 10/1994 | Schroeder | |
| 5,353,038 A | 10/1994 | Osborne et al. | |
| 5,369,410 A | 11/1994 | Reich | |
| 5,374,011 A | 12/1994 | Lazarus et al. | |
| 5,394,119 A * | 2/1995 | Pleva et al. ....................... | 333/35 |
| 5,650,249 A | 7/1997 | Dull et al. | |
| 5,698,316 A | 12/1997 | Kuras et al. | |
| 5,810,284 A * | 9/1998 | Hibbs et al. ...................... | 244/13 |
| 5,970,393 A * | 10/1999 | Khorrami et al. ............. | 455/129 |
| 6,117,517 A | 9/2000 | Diaz et al. | |
| 6,175,332 B1 | 1/2001 | Fedors | |
| 6,194,095 B1 | 2/2001 | Hockaday | |
| 6,286,410 B1 | 9/2001 | Leibolt | |
| 6,400,647 B1 | 6/2002 | Huntress | |
| 6,440,244 B1 | 8/2002 | Diaz et al. | |
| 6,496,151 B1 | 12/2002 | Ferreri et al. | |
| 6,550,717 B1 | 4/2003 | MacCready et al. | |
| 6,638,466 B1 | 10/2003 | Abbott | |
| 6,762,071 B2 | 7/2004 | Eliasson et al. | |
| 6,868,314 B1 | 3/2005 | Frink | |
| 6,954,182 B2 * | 10/2005 | Knapp .......................... | 343/705 |
| 7,108,841 B2 | 9/2006 | Smalley et al. | |
| 7,119,745 B2 | 10/2006 | Gaucher et al. | |
| 7,126,553 B1 | 10/2006 | Fink et al. | |
| 7,276,703 B2 * | 10/2007 | Berkcan et al. ............ | 250/358.1 |
| 7,331,546 B2 * | 2/2008 | Ifju et al. .................... | 244/123.1 |
| 7,343,265 B2 * | 3/2008 | Andarawis et al. ........... | 702/188 |
| 7,558,701 B2 * | 7/2009 | Andarawis et al. ........... | 702/183 |

(Continued)

OTHER PUBLICATIONS http://www.flickr.com/photos/xeni/sets/72057594100567180/, website, Applied Research Associates TACMAV,—The SkySeer MAV.

(Continued)

*Primary Examiner* — Rob Swiatek
*Assistant Examiner* — Philip J Bonzell
(74) *Attorney, Agent, or Firm* — Kyle Eppele; J. Eric Anderson (57) ABSTRACT

A composite flexible and aerodynamic load bearing wing structure suitable for compact unmanned vehicles, is described. Flexible printed circuitry and micro fuel cells can be incorporated as, or part of, the flexible aerodynamic structure. Accordingly, the overall system configuration can be optimized with respect to weight, space and size requirements. The flexible aerodynamic structure for the unmanned vehicle may be configured with a flexible dielectric substrate having an electrical contact on at least one surface of the substrate, and a flexible printed circuit disposed upon the substrate. The printed circuit can flex with the substrate and the substrate, with the printed circuit, to form a load lifting aerodynamic wing configuration when unfolded from a folded position.

14 Claims, 7 Drawing Sheets

U.S. PATENT DOCUMENTS

| | | | |
|---|---|---|---|
| 7,571,058 B2 * | 8/2009 | Sealing et al. | 702/34 |
| 7,948,147 B2 * | 5/2011 | Carralero et al. | 310/311 |
| 2002/0125368 A1 | 9/2002 | Phelps, III et al. | |
| 2004/0207560 A1 * | 10/2004 | Knapp | 343/705 |
| 2004/0245393 A1 * | 12/2004 | Ifju et al. | 244/123 |
| 2006/0049305 A1 | 3/2006 | Porter | |
| 2006/0051592 A1 | 3/2006 | Rawlings et al. | |
| 2006/0261213 A1 | 11/2006 | Lavan | |
| 2006/0284005 A1 * | 12/2006 | Ifju et al. | 244/49 |
| 2007/0114422 A1 * | 5/2007 | Berkcan et al. | 250/358.1 |
| 2007/0118301 A1 * | 5/2007 | Andarawis et al. | 702/33 |
| 2007/0118335 A1 * | 5/2007 | Andarawis et al. | 702/188 |
| 2007/0230085 A1 | 10/2007 | Le | |
| 2007/0231156 A1 | 10/2007 | Hong | |

OTHER PUBLICATIONS http://faculty.nps.edu/ravi/BioRobotics/Projects.htm, website, Morphing Micro Air Land Vehicle (MMALV).

Lynntech, Inc.; Integrated Energy Supply and Wing Structure for Micro-Unmanned Aerial Vehicles; SMFM Website, available online at least by May 9, 2007 at http://www.darpa.mil/dso/thrust/matdev/smfm/lynntech.html.

Toon, John; Nature's Flight System Could Be the Key to Exploring the Newest Frontier; Research Horizons; available online at least by May 9, 2007 at http://gtresearchnews.gatech.edu/reshor/rh-f01/mars.html.

Keennon, Matt; First Fuel-Cell Flight; Model Airplane News, Air Age Publishing, Sep. 2003.

Curtis, David; Conformal Array Antenna Technology; available online at least by Apr. 26, 2007 at http://www.afrlhorizons.com/Briefs/Feb04/SN0310.html.

Marsh, George; Airships: Making a Comeback; Apr. 1, 2004.

Georgia Institute of Technology; Flying on Hydrogen: Georgia Tech Researchers Use Fuel Cells to Power Unmanned Aerial Vehicle; Aug. 28, 2006.

Reinhardt, Lamp, Geis, and Colozza; Solar-Powered Unmanned Aerial Vehicles; IEEE, 0-7803-3547-3-7/16; pp. 41-46, 1996.

DRDO.ORG; Antenna Systems; available online by at least May 9, 2007 at http://www.drdo.org/pub/techfocus/aug05/antena.htm.

Martinez-Russ, Tapia; Solar-Powered Plane Would Fly by Flapping; Global Climate Change and Warming, Solutions Spring 2004, May 19, 2004.

* cited by examiner

FLEXIBLE SELF-ERECTING SUBSTRUCTURES FOR SENSOR NETWORKS

FEDERALLY-SPONSORED RESEARCH AND DEVELOPMENT

This invention (Navy Case No. 098680) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

BACKGROUND

This disclosure relates to substructures for sensor systems. More particularly, this disclosure relates to flexible self-erecting aerodynamic substructures for sensor networks.

SUMMARY

The foregoing needs are met, to a great extent, by the present disclosure, wherein systems and methods are provided that in some embodiments facilitate a flexible aerodynamic structure for an unmanned vehicle, comprising: a flexible dielectric substrate having an electrical contact on at least one surface of the substrate; a flexible printed circuit disposed upon the substrate, wherein the printed circuit flexes with the substrate and wherein the substrate, with the printed circuit, form a load lifting aerodynamic wing configuration when unfolded from a folded position.

In accordance with another aspect of the present disclosure, an unmanned vehicle is provided, comprising: a flexible dielectric substrate having an electrical contact on at least one surface of the substrate; a flexible printed circuit disposed upon the substrate, wherein the printed circuit flexes with the substrate and wherein the substrate, with the printed circuit, form a load lifting aerodynamic wing configuration when unfolded from a folded position; and a propulsion system.

In accordance with yet another aspect of the present disclosure, a network of unmanned vehicles is provided, comprising: a plurality of flexible dielectric substrates having a electrical contacts on at least one surface of each of the plurality of substrates; a flexible printed circuit antenna disposed upon each of the plurality of substrates, wherein the printed circuit antennas flexes with the plurality of substrates and wherein the substrates, with the printed circuit antenna, form load lifting aerodynamic wing configurations when unfolded from a folded position; and a propulsion system for each unmanned vehicle, wherein the array of unmanned vehicles, when oriented in a specific pattern, increases telecommunications capabilities.

DETAILED DESCRIPTION

Introduction

Presently, wireless networks of unmanned vehicles (UVs) and sensors are currently being used by the military for tactical intelligence, surveillance, and reconnaissance (ISR). UV operations are constrained by several physical and size factors. Specifically, network capabilities are limited by available remote power and communication capacities (i.e. baud and bit rate) between network nodes. Solar cell arrays are commonly used as a remote power source, but are mainly limited by weather patterns and their mass and volume energy density. In addition to solar and mechanical collection of energy (i.e. hydro, wind), non-renewable and energy storage in batteries (Li-ion, NM-Hydride) is commonly employed. In some cases, zinc-oxide batteries have also been demonstrated for UV applications. Additionally, data retrieval and sending between nodes (RF communication) is limited by UV endurance and transceiver capabilities (i.e. low power wireless communications systems have an effective transmission range of about 5 km).

Microstrip antennas or printed antennas are used for telecommunications, whereas microstrip patch antennas are the preferred antenna for mobile communications, satellite, and wireless-LAN applications. Due to their small size, they are usually employed at high frequency bands—VHF, UHF and SHF, but traditionally with a small bandwidth. To increase bandwidth, microstrip patch antennas are raised above a ground plane with dielectric spacers (see L3 Communications for their high bandwidth patch antenna).

Fabrication of microstrip antennas is similar to the fabrication of a printed circuit board (PCB). Fabrication is performed by applying a conductive ink pattern, or trace element on a dielectric substrate. This substrate can be rigid or flexible. Having a flexible substrate allows the substrate to conform to the outer surface of some air, ground and surface vehicles. This results in significant space saving as the electrical device/antenna can now be "shaped" to fit the contour of the vehicle's surface, rather than taking up valuable space within the vehicle. Consequently, a higher density of devices can be fitted into/onto a vehicle.

In other applications, surface mounted microstrip antennas are used for aeronautical telecommunication in the military and industry. An example of such an application is disclosed in U.S. Pat. No. 6,868,314 granted to Frink. Flexible antennas, described in this patent to Frink, are incorporated into rigid structural elements of an aerial vehicle. Frink uses the flexible printed circuitry to cover the rigid winged section of the aerial vehicle, which suggests covering portions of the fixed wing ribs and fixed spars. However, Frink does not imply or suggest flexing or movement of the printed circuitry during operation, only during its fabrication into the vehicle.

Currently, power requirements for unmanned aerial vehicles (UAVs) are shared between the main propulsion system or auxiliary power units (APU), for powering subsystem components. The main propulsion system commonly consists of an internal combustion engine, or an electric motor fed from an electrical power source. The electrical power source (typically for low power applications) is driven from a variety of technologies such as closed system batteries, solar cells, and types of fuel cells. The electrical power demand for propulsion systems, and or auxiliary subsystems, can be on the order of a few watts to hundreds of watts depending on the payload and mission requirements (mainly for sensors or communications). In the need for kilowatts and megawatts, dynamic conversion systems such as turbines are used.

In smaller UVs, a fuel cell can be utilized as the primary source of power. Smalley et al. in U.S. Pat. No. 7,108,841 discloses thin walled carbon nanotubes (SWNT) as being a flexible fuel cell structure, however, there is no suggestion of the use of a thin flexible fuel cell structure as part of an aerodynamic structure, or similarly for a flexible membrane electrode assembly.

In related systems, the printed circuitry for UVs is either packaged separately from the aerodynamic design, or rigidly incorporated into the design. To this date, the concept of circuitry flexing after fabrication has not been suggested or practiced. As an example, transceivers for current micro aerial vehicles are designed with built-in loop antennas having limited capabilities because of the vehicle's size, location, and power source constraints.

Discussion

The above shortcomings in the field are, in many respects, addressed by the development and use of composite flexible and self-erecting load bearing structures as disclosed herein. In some embodiments, by incorporating flexible printed circuitry and micro fuel cells (for example, microstrip antennas, direct methanol fuel cells (DMFCs), and so forth) as, or part of, a flexible aerodynamic structure, the overall system configuration can be optimized with respect to weight, space and size requirements.

Such flexible microstrip antenna materials can be used to develop a suite of interoperable transceivers to broaden communication capabilities of network centric warfare for an array of micro air vehicles (MAVs) or other network sensors (such as, for examples, unattended ground sensors (UGS), unattended sensor vehicle (USV), unattended ground vehicle (UGV), and so forth). In addition to passive sensing and network communication functions, the transceiver can be tactically used as a decoy, or an arrayed network, as in an arranged fleet of decoys. Signal jamming and other electronic warfare can also be performed from such unmanned vehicle (UV) platforms.

An exemplary function that is exploited from the flexible aerodynamic structures (with its associated flexible sensor/actuator circuitry, in many instances) is to collapse the UAV to fit in a portable canister, for ease of transport, or remote deployment. These collapsible UAV's are generally referred to as collapsing wings. An example of a collapsing wing is seen in Applied Research Associates TACMAV, which utilizes carbon fiber composite wings which axially wrap around the fuselage for storage. The SKYSEER MAV is another example MAV with flexible wings but the wings are operator erected at the time of use. Another MAV, the biologically inspired Morphing Micro Air Land Vehicle (MMALV) has a configuration whereby the flexible wings dynamically retract while maneuvering on the ground. All the above MAVs are examples of unmanned vehicles that can be deployed by hand or remotely launched from other unmanned platforms or humanly deployed.

However, the systems and methods disclosed herein, symbiotically enhance these compact vehicles by developing interoperable power source and sensor/actuator subsystems that have high energy density (e.g. micro fuel cell) technology and thin film sensor/actuator materials concurrently optimized for minimizing size, space, weight, and other MAV related requirements (e.g. removable wings with interoperable sensor/actuator substructures). As such, the actual power sources and sensors are configured to be flexible and are incorporable into the actual airframe or flying structure of the MAV. Thus, a marriage of aerodynamic structures that are flexible, and are designed with power sources and/or sensors that flex with the aerodynamic structure are described.

Therefore, the systems and methods disclosed herein provide a novel airframe, power, sensor/actuator, and network capability design for unmanned aerial vehicles by integrating flexible printed circuitry on interchangeable and interoperable flexible aerodynamic structures of these unmanned systems. While these systems and methods are demonstrated in this disclosure by using a micro aerial vehicle (MAV) deployment platform, it should be understood that other platforms, vehicles, or deployment structures may be contemplated based on design preference and requirements.

Figure 1:
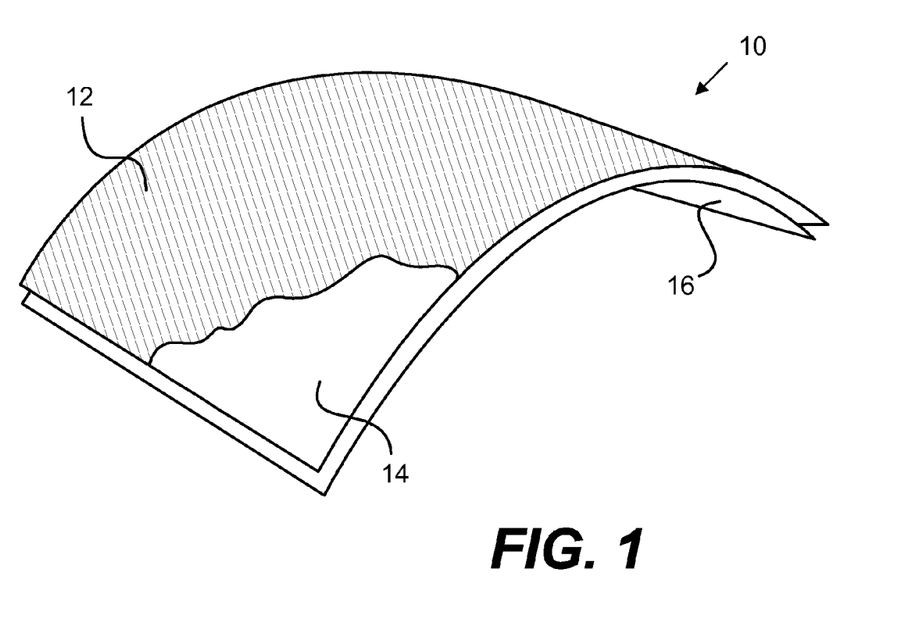
FIG. 1 is a perspective illustration of an exemplary flexible self-erecting aerodynamic element 10.

FIG. 1 is a perspective illustration of an exemplary flexible self-erecting aerodynamic element 10. The aerodynamic element 10 is configured with an integrated membrane electrode assembly 12, 14 and 16. Electrode assembly 12 denotes an electrode, such as, for example, a catalyst with a gas diffusion layer on a free breathing cathode, and electrode assembly 14 denotes a solid flexible polymer electrolyte membrane with opposing electrode underneath 16. As should be understood by one of ordinary skill in the art, in the context of this disclosure, other electrode assembly 12 constituents or types of materials may be used according to design preference. Therefore, non-gas diffusion or free breathing cathode elements may be used without departing from the spirit and scope of this disclosure.

The exemplary aerodynamic element 10 demonstrates a substrate suitable for the implementation of a flexible printed circuitry in a flexible aerodynamic structure, such as a wing structure. The wing configuration implies that the aerodynamic element 10 may support a fuselage or other object. The flexible circuitry may be printed on a flexible dielectric substrate such as a polymer or polyimide substrate (non-limiting examples being DuPont's Kapton® or Pyralux®). The materials used in the flexible circuitry can be constructed from conductive inks, plastics metals, and suitable materials. The flexible aerodynamic element 10 is able to flex after fabrication, to enable the efficient use of volume during transport or containment, reduction of overall system weight, or system propulsion, for example. Printed circuitry may be "built-in" to the aerodynamic element 10 or adhered over the aerodynamic 10, for example, as a laminate. In certain embodiments, it should be appreciated that depending on design objectives, the aerodynamic element 10 being flexible and compacted, may be self-erecting or may be erected using a secondary mechanism.

In some embodiments, the printed circuitry may be integrated into the flexible aerodynamic structure as a printed antenna, thus allowing the incorporation of microstrip, loop, or other antennas into/onto the flexible aerodynamic structure. In certain embodiments, the antenna can be part of a RF receiver and/or transmitter, or other electromagnetic transfer mechanism.

Figure 2:
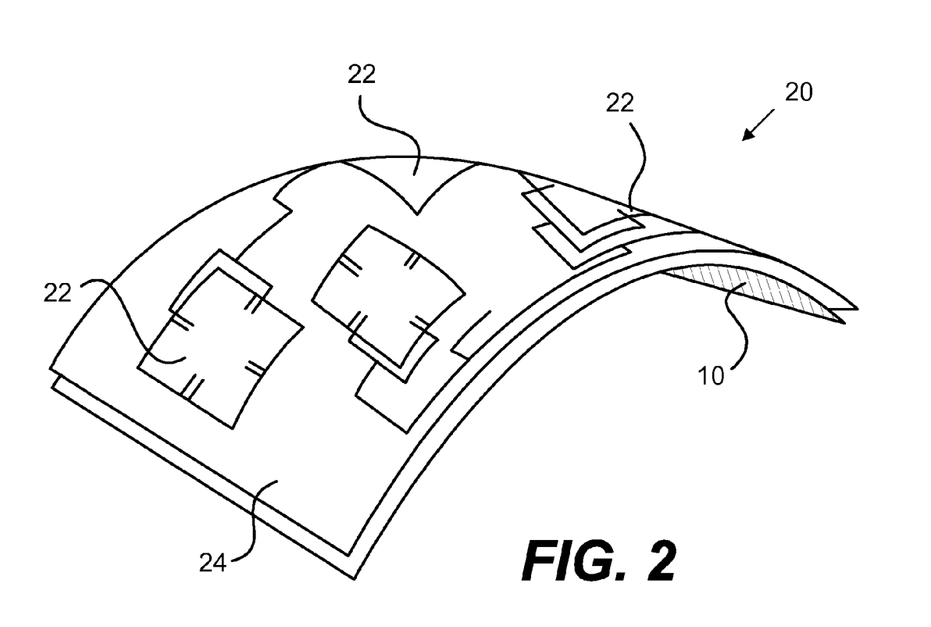
FIG. 2 is a perspective illustration of an exemplary printed circuitry subarray 20.

FIG. 2 is a perspective illustration of an exemplary printed circuitry subarray 20. The printed circuitry subarray 20 is comprised of a plurality of radiating elements 22, which may be of the type commonly used on a microstrip or patch antenna. A dielectric substrate 24 separates the subarray 20 from the flexible aerodynamic element 10. The subarray 20 demonstrates the use of a plurality of radiating elements 24, with flexing capabilities in a flexible aerodynamic structure. Therefore, phased systems and or multiple sensor systems can be employed on a single structure, rather than on separate structures. It should be noted that while the illustration in FIG. 2 shows "rectangular" radiating elements 22, other shapes and configurations for the radiating elements 22 may be used according to design preference.

Figure 3:
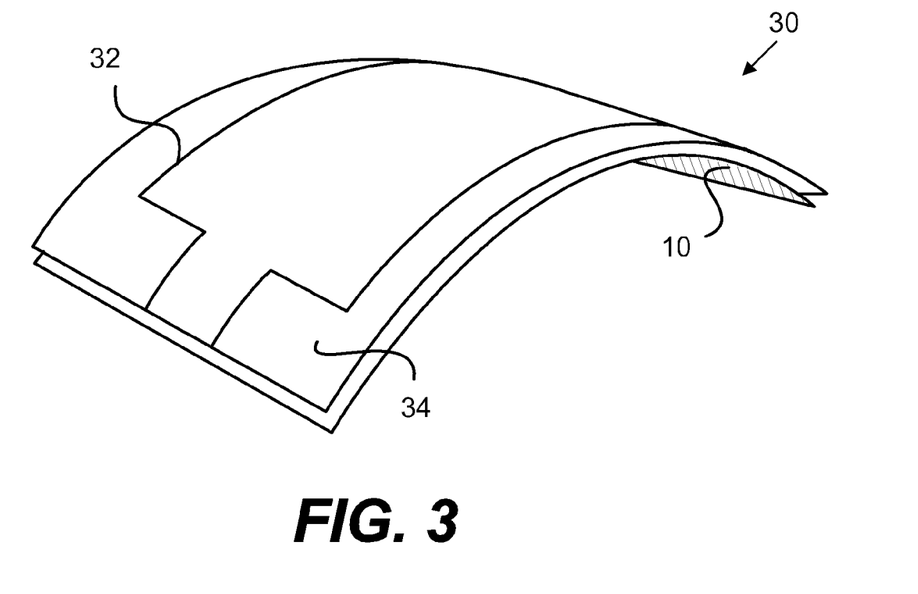
FIG. 3 is a perspective illustration of an exemplary single rectangular loop antenna 30.

FIG. 3 is a perspective illustration 30 of an exemplary single rectangular loop antenna 32 impressed on a flexible dielectric substrate 34. The flexible dielectric substrate 34 is disposed on the flexible aerodynamic element 10.

In some embodiments, for the printed circuitry, or printed antennas, the trace ink can be formed conductive materials such as conductive plastics, metals (i.e. gold, silver, copper, aluminum), or any conductive matter. In certain embodiments, the printed circuitry, or printed antennas may be designed with structural memory. Accordingly, the self-erecting characteristic of a so-designed exemplary element 10, may be achieved via the structural memory elements disposed in or on the aerodynamic element 10.

Figure 4:
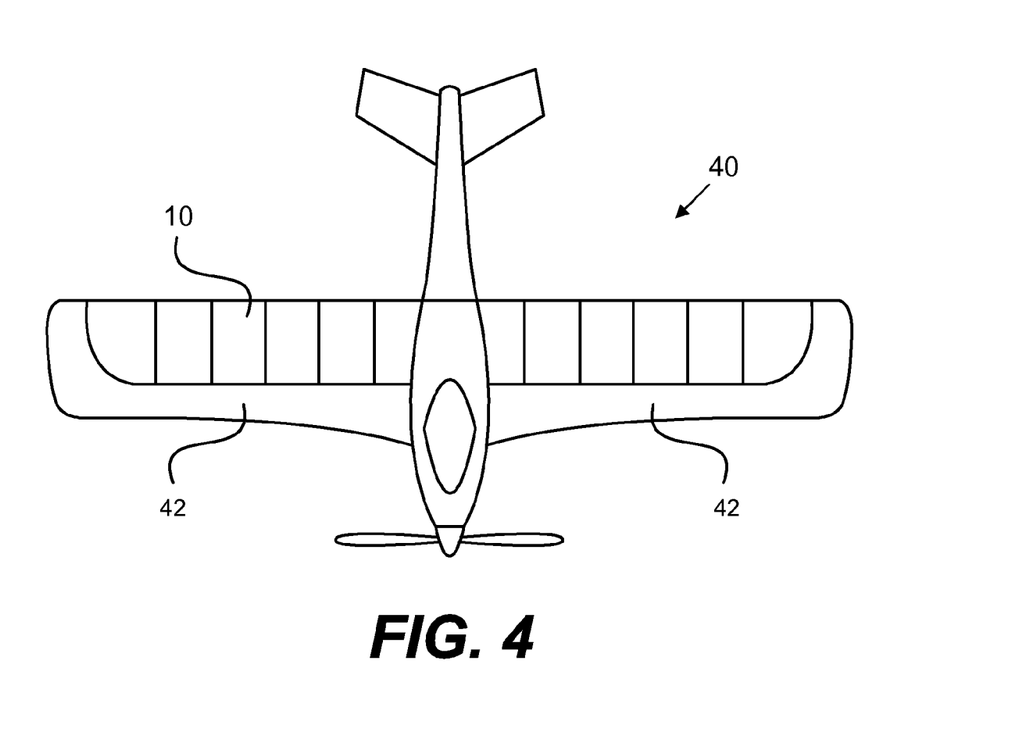
FIG. 4 is a top view 40 of a "deployed" exemplary micro aerial vehicle.

FIG. 4 is a top view 40 of a "deployed" exemplary micro aerial vehicle. The flexible aerodynamic element 10 may constitute the main wings 42 of the aerial vehicle or may constitute a portion of the wings 42. The wing structure shown in FIG. 4 is a typical structure for micro aerial vehicles used in ISR environments. However, other micro aerial or aerial vehicle shapes or configurations may be used according to design preference. Therefore, modifications to the shape and/or configuration or type of vehicle (including mode of propulsion) may be made without departing from the spirit and scope of this disclosure. As is apparent from this disclosure, the flexible aerodynamic element 10 may include any one or more of the flexible circuitry or antennas or systems described herein.

Figure 5:
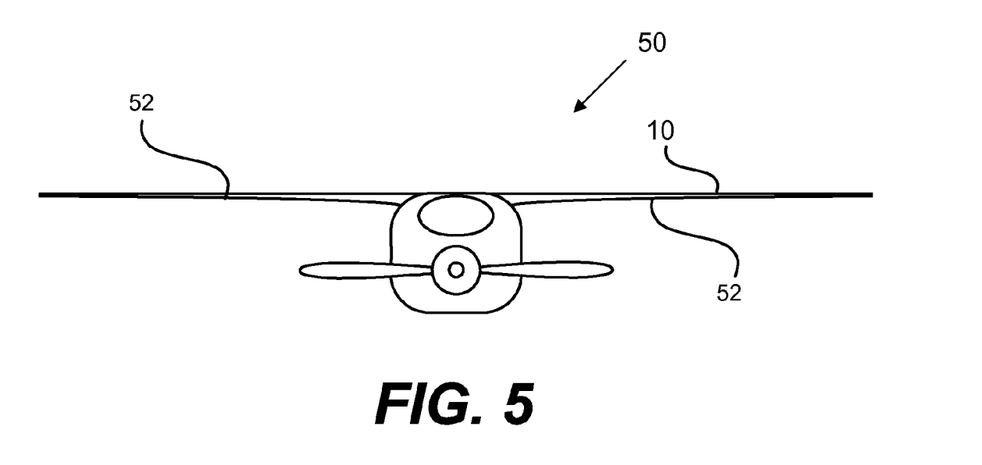
FIG. 5 is a front view 50 of a "deployed" exemplary micro aerial vehicle.

FIG. 5 illustrates a front view 50 of a micro aerial vehicle with wings 52 in an erect position. The wings 52 may be made entirely of the aerodynamic element 10, if desired.

Figure 6:
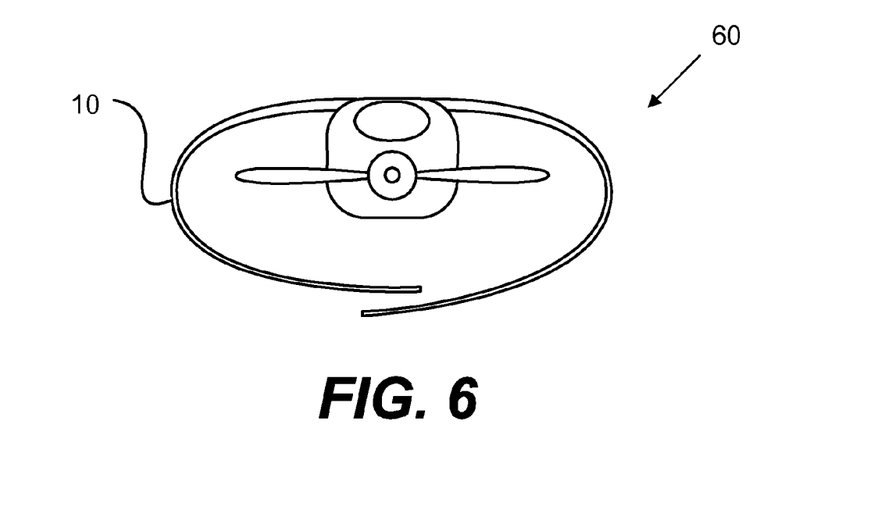
FIG. 6 is a front view 60 of an un-deployed exemplary micro aerial vehicle.

FIG. 6 is a front view 60 of an un-deployed exemplary micro aerial vehicle. Of note in FIG. 6 is the fact that the sensor elements (antennas, for example) on the aerodynamic element 10 are in a flexed configuration. Due to the ability of the aerodynamic element 10 to be flexed (with its incorporated sensors/antennas), the volume of the micro aerial vehicle can be reduced, when not deployed. Accordingly, more vehicles can be mobilized for a given delivery platform or shipment.

Figure 7:
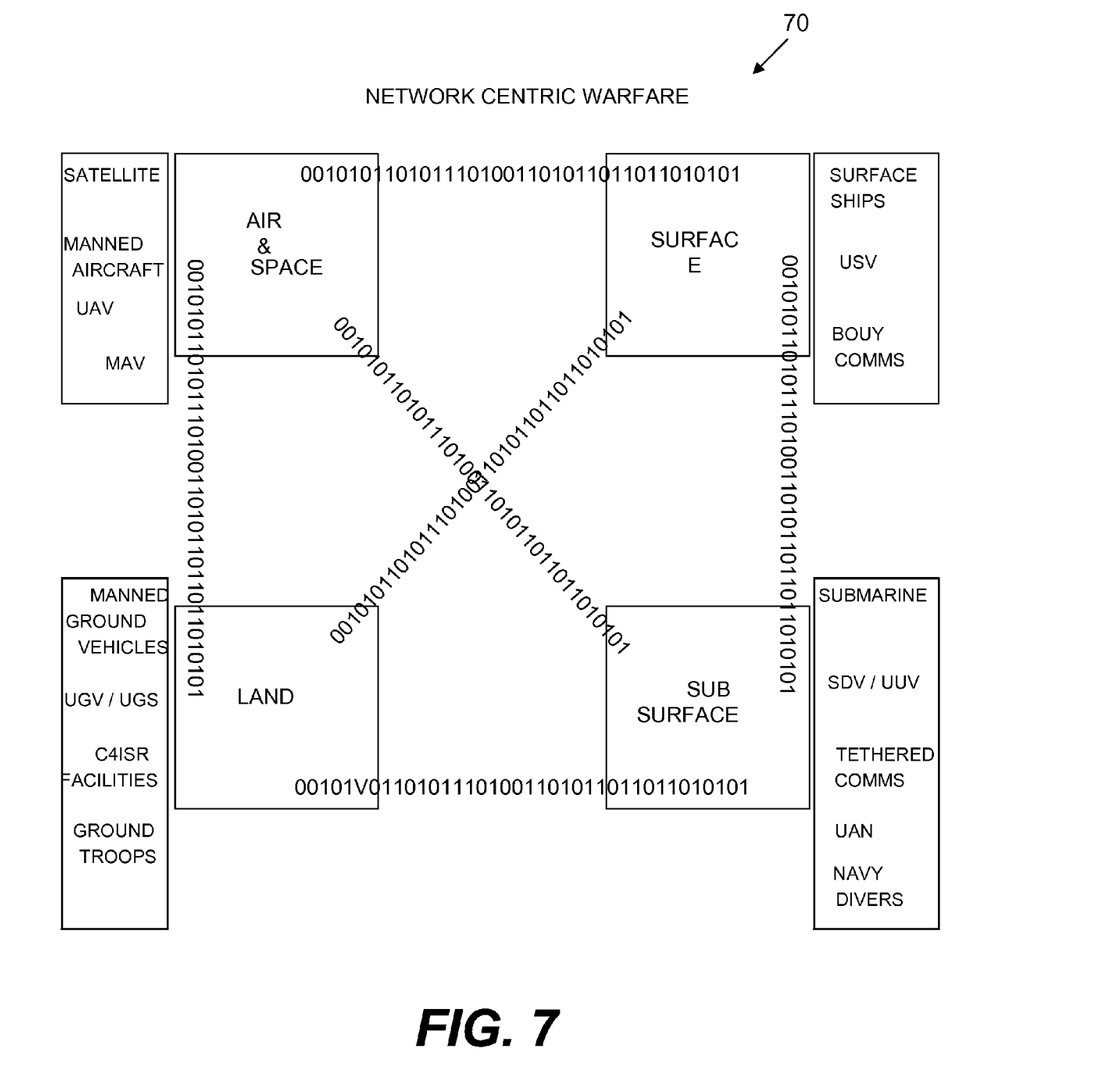
FIG. 7 is a block diagram 70 of an exemplary Network Centric Warfare structure.
Figure 8:
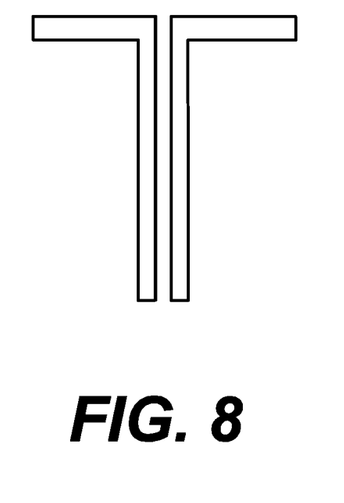
FIGS. 8-13 illustrate various antenna configurations that can be implemented in embodiments of the disclosed system.
Figure 9:
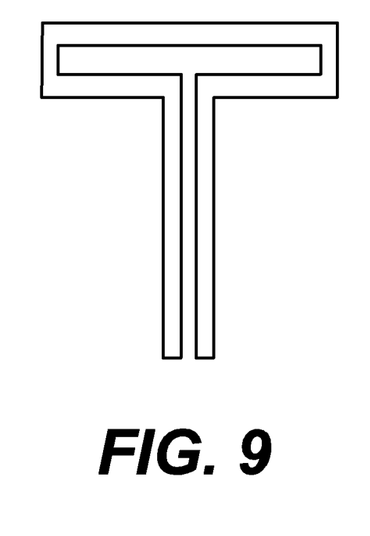
Figure 10:
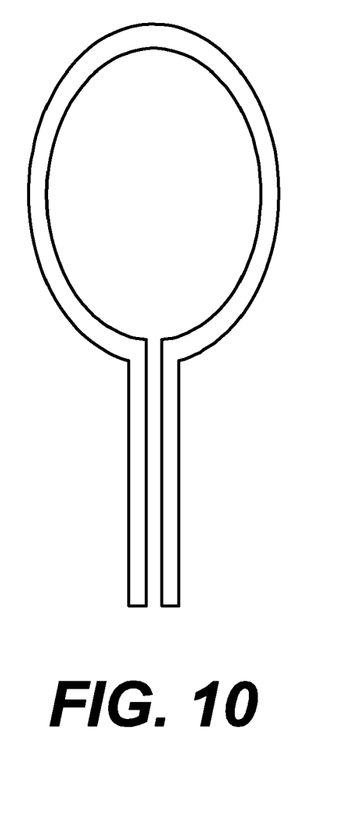
Figure 11:
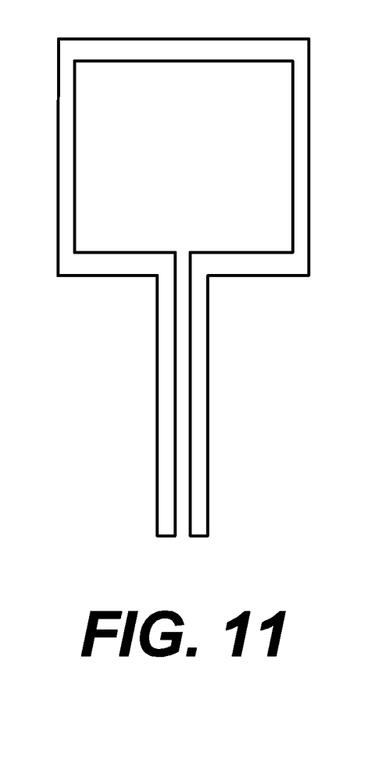
Figure 12:
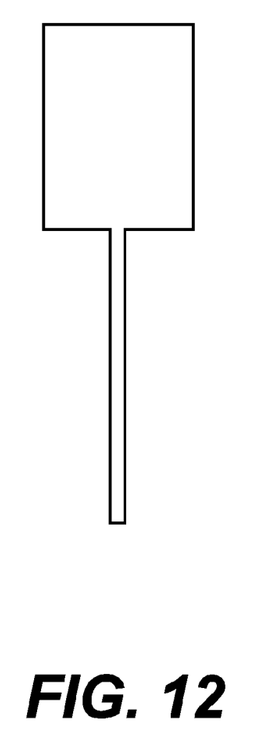
Figure 13:
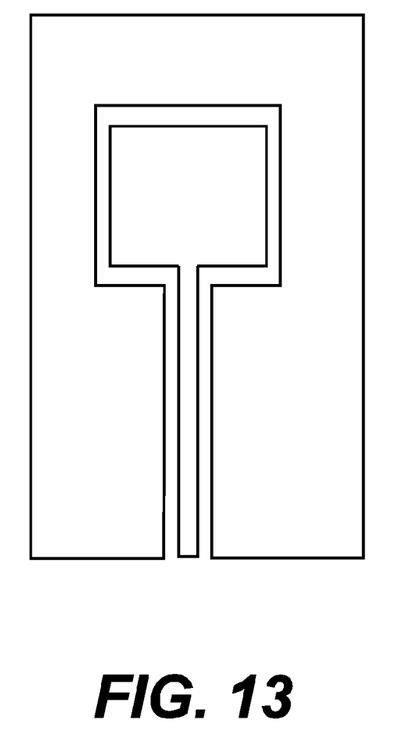
Figure 14:
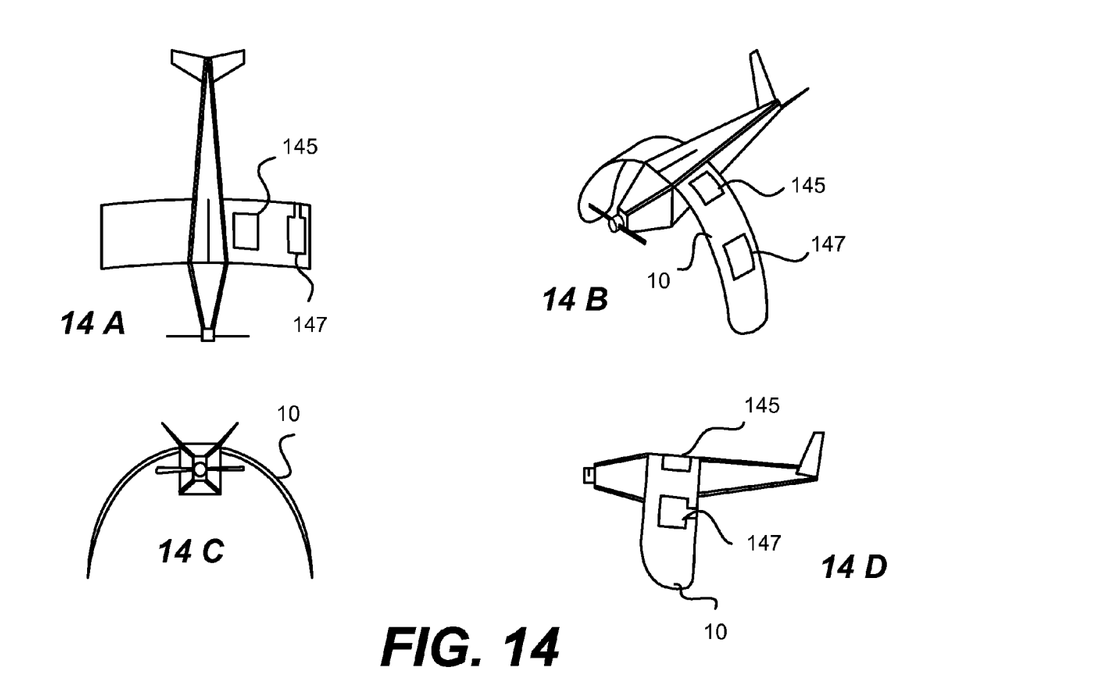
FIGS. 14A-14D illustrate various configurations of an exemplary micro aerial vehicle.

FIG. 7 is a block diagram 70 of an exemplary Network Centric Warfare (NCW) structure. The NCW structure shows how various vehicles/assets can be utilized to provide complete NCW coverage. It should be noted that each of the Air & Space, Surface, Land and Sub Surface modes may utilize an exemplary vehicle or structure. For example, Sub Surface (underwater) modes may have remotely controlled or autonomous vehicles such as mini-subs configured with the aerodynamic elements 10, disclosed herein. Of course, in this sub surface environment, the aerodynamic element 10 can be adjusted for travel through a liquid. As is apparent from FIG. 7, multiple modes of operations can be envisioned with systems designed with vehicles configured with an exemplary flexible aerodynamic element 10. Thus, enhanced network capabilities are enabled by this disclosure in the areas of platform endurance, mechanical design (size and weight), and various extended transmitter and receiver capabilities.

FIGS. 8-13 illustrate various antenna configurations that can be implemented in embodiments of the disclosed system.

FIGS. 8, 9, 10, 11, 12, 13 illustrate a dipole, folded dipole, ring, rectangular loop, patch, and coplanar patch antenna, respectively. Of course, FIGS. 8-13 are not exclusive of other types of antenna configurations, but are presented to show how various shapes may be implemented. As one of ordinary skill in the art is aware, numerous other shapes of antennas may be implemented, without departing from the spirit and scope of this disclosure.

These various antennas make possible compact transceivers and spatial power combiners, which allow for greater electronic payload for a given unit size. In various embodiments, the advanced antenna capabilities can be further expanded when coupled with a micro fuel cell. Currently fuel cells have approximately 2-4 times the mass energy density of advanced batteries (lithium-ion), with the potential of 20× for the direct methanol fuel cell. Extended flight times, available peak power levels, and absence of down time for recharging are benefits of a fuel cell which are relevant to propulsion or subsystem power requirements, as in a transceiver. Additionally, by exploiting the thin characteristics of a fuel cell membrane electrode assembly into the flexible substructure, enhanced volume and mass power densities are perceived.

Furthermore, by utilizing the air pressure experienced by a vehicle at speed, decreased stoichiometric flow rates of the reactants, and decreased cathode flooding is expected.

FIGS. 14A-14D illustrate various configurations of an exemplary micro aerial vehicle. Fuel cell components and/or membrane electrode assembly 145 are shown with the flexible aerodynamic element 10. Also shown is a printed loop antenna 147, with the flexible aerodynamic element 10. In this embodiment, the flexible aerodynamic element 10 is not fully erect. The erection of the aerodynamic element 10 may be obtained by triggering the fuel cell as described herein.

Figure 15:
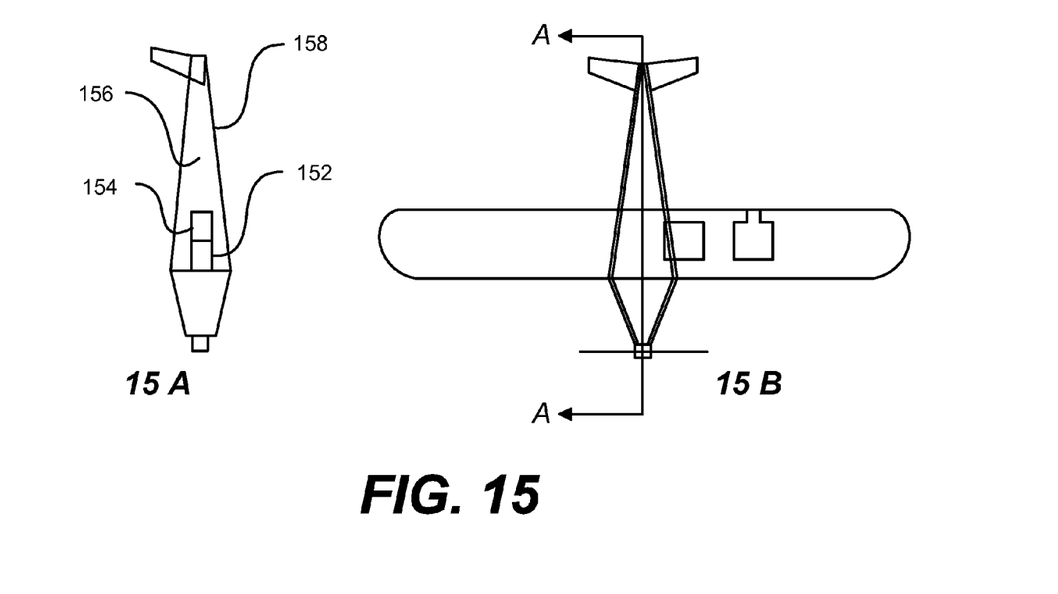
FIGS. 15A-15B illustrate a cut-away-view and top view, respectively of an exemplary micro aerial vehicle.

FIGS. 15A-15B illustrate a cut-away-view and top view, respectively, of an exemplary micro aerial vehicle. As demonstrated in FIG. 15A, the fuel cell components 154 and cavity for fuel 156 may be housed in the fuselage 158 of the vehicle. Supporting or payload electronics 152 may also be housed in the fuselage 158.

Propulsion systems for these vehicles may be any one or more of an internal combustion engine, jet engine, rocket or electric motor, as non-limiting examples of several possibilities. For example, an electric motor can be powered by, or partially powered, by a low temperature fuel cell such as a Direct Methanol Fuel Cell (DMFC), Proton Exchange Membrane Fuel Cell (PEMFC), Direct Borohydride Fuel Cell (DBFC), and Solid Oxide Fuel Cell (SOFC). In view of the disclosure provided herein, a fuel cell propulsion system or APU can be built into the flexible self-erecting substructure/element 10.

In some embodiments, the APU can be positioned for supporting payload or system processes separately or in addition to supplying energy for the propulsion system. Examples of system or support processes are: navigation, auto pilot, wireless communication, networking, sensors, avionics, controls, electronic warfare, data storage, and so forth. Of course, it is understood that the above list is only a sample of what systems or processes or propulsion systems may be powered by aerodynamic element 10 configured with a power-generating fuel cell.

The expanded energy endurance in the exemplary systems and methods disclosed herein, when compared to conventional battery sources, can be used as a source for thermal stimuli of shape memory polymer or memory metal. Therefore, the thermal energy from an incorporated power generation system, for example, a fuel cell system, can be used as thermal stimuli to perform self-erection of the structure.

It should be appreciated that the flexible aerodynamic element 10 may also be formed from a combination of metals, plastics, or other elastic materials. As stated above, materials that have a dynamic shape as a result of thermal stimuli, referred to as shape memory polymer or shape memory alloy, memory metal (for example, Ni—Ti alloy), can be used as part of the aerodynamic structure, or flexible printed circuitry (i.e. dielectric substrate). Thus, self-erecting flying wings constructed of flexible composites for power/sensor/actuator substructures can be more rapidly erected at the time of launch. In addition, for a rigidly actuating aerodynamic structure with hinged connections, non-flexing materials for printed circuitry can be utilized between hinged joints.

Based on the exemplary embodiments illustrated in FIGS. 1-15, printed antennas may be coupled with a networked array of UAVs, oriented in specific patterns, therefore increasing telecommunications capabilities (i.e. antenna range, antenna gain, and bandwidth) of the deployed vehicle. In networking UAVs, combination of a phased array of antennas, or active antenna array (i.e. time and frequency domain beamformers), can be formed for a fixed radiation pattern, or to scan rapidly in azimuth or elevation.

An array of wirelessly networked UAVs patterned in a specific formation can be designed with individual UAVs having expanded telecommunication potential with adjacent UAVs with micro strip antennas. Also, a deceptive pattern of electromagnetic radiating UAVs could be utilized in electronic warfare scenarios. Multi-static and spatially diverse networked radar configurations of exemplary UAVs may now be considered as a cost-effective scenario.

Given the above disclosure, modifications to the exemplary systems and methods may be made without departing from the disclosure's spirit and scope. For example, in some embodiments, a non-flexible self-erecting aerodynamic substructure may be envisioned where "flying" portions of the vehicle are rigid. In these instances, the rigid structures may not be designed for composite power/sensor/actuator use. For example, retractable rigid wing structures may be configured with conformal sensor/actuator/power source substructures which are fused or attached to such rigid aerodynamic subcomponents. Thus, an alternative construction of self-erecting MAV power/sensor/actuator subsystems may include the use of rigid materials that are hinged to a central body. At the time of launch, the actuators (e.g. springs, motors, etc.) of such an embodiment may move the hinged rigid substructures to their in-flight configuration, with the flexible power/sensor/actuator elements moving in concert to their deployed position. That is, for example, a flexible antenna may be extended or "opened" as a part of the movement of the rigid structure. Thus, the use of flexible interoperable composite materials enables more variable embodiments with respect to size, space, and power.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. An unmanned vehicle, comprising:
    a flexible dielectric substrate having an electrical contact on at least one surface of the substrate;
    a flexible printed circuit disposed upon the substrate, wherein the printed circuit flexes with the substrate;
    a flexible fuel cell membrane electrode assembly built into the flexible dielectric substrate;
    and wherein the substrate, with the printed circuit, form a load lifting, collapsible aerodynamic wing that is configured to self-erect from a folded position upon receiving thermal stimuli from the fuel cell; and
    a propulsion system mounted to the substrate.

2. The unmanned vehicle according to claim 1, wherein the fuel cell is a low temperature fuel cell.

3. The unmanned vehicle according to claim 2, wherein the fuel cell is at least one of an Direct Methanol Fuel Cell, Proton Exchange Membrane Fuel Cell, Direct Borohydride Fuel Cell, and Solid Oxide Fuel Cell.

4. The unmanned vehicle according to claim 1, further comprising, a layer of shape memory polymer bonded to the substrate.

5. The unmanned vehicle according to claim 4, wherein the shape memory polymer self-erects due to the thermal stimuli from the fuel cell.

6. The unmanned vehicle according to claim 1, wherein the printed circuit is made of a material with structural memory such that the printed circuit contributes to the self-erecting capability of the wing.

7. The unmanned vehicle according to claim 6, wherein the printed circuit is made of a Nickel-Titanium shape memory alloy.

8. The unmanned vehicle according to claim 6, wherein the printed circuit is an antenna.

9. The unmanned vehicle according to claim 8, wherein the antenna is separated from the fuel cell membrane by the dielectric substrate and wherein the fuel cell comprises a free-breathing cathode layer and an opposing electrode layer separated from the cathode layer by a polymer electrolyte membrane, and wherein the cathode layer is disposed on an outer surface of the wing.

10. The unmanned vehicle according to claim 9, wherein the antenna is at least one of a printed antenna, microstrip antenna, patch antenna, and loop antenna.

11. The unmanned vehicle according to claim 9, wherein the flexible dielectric substrate is manufactured from polymer.

12. The unmanned vehicle according to claim 11, wherein the flexible dielectric substrate is made from polyimide.

13. The unmanned vehicle according to claim 10, wherein the flexible aerodynamic wing is non-inflatable.

14. An unmanned vehicle, comprising:
    a flexible, foldable, self-erecting, non-inflatable, laminate, aerodynamic wing comprising a flexible fuel cell membrane electrode assembly layer and a flexible printed antenna layer separated from the fuel cell membrane electrode assembly layer by a flexible dielectric layer, and wherein the fuel cell membrane electrode assembly layer comprises a free-breathing cathode layer and an opposing electrode layer separated from the cathode layer by a polymer electrolyte membrane, and wherein the cathode layer is disposed on an outer surface of the wing, and wherein the wing is configured to self-erect upon receiving a thermal stimuli from the fuel cell; and
    a propulsion system mounted to the wing.

* * * * *